March 11, 1969  A. P. COX, JR., ET AL  3,432,851
SIGNAL PROCESSOR

Filed Dec. 22, 1966  Sheet 1 of 3

INVENTORS
Andrew P. Cox Jr. and
William L. Price
BY
ATTORNEY

United States Patent Office 3,432,851
Patented Mar. 11, 1969

3,432,851
SIGNAL PROCESSOR
Andrew P. Cox, Jr., Lutherville, and William L. Price, Glen Burnie, Md., assignors to Westinghouse Electric Corporation, Pittsburgh, Pa., a corporation of Pennsylvania
Filed Dec. 22, 1966, Ser. No. 603,998
U.S. Cl. 343—6.5                 33 Claims
Int. Cl. H01s 9/56

ABSTRACT OF THE DISCLOSURE

A signal processor which receives signals on individually enabled channels, from transponders of an array, after an interrogation signal is transmitted, to determine and record ranges to specific transponders. A control circuit transfers the count in a running range counter to storage means in response to one or more received transponder signals, and in addition transfers information relative to which transponder sent the received signal. When all the data desired are stored, the control circuit transfers the information to either a visual display or a computer. The computer acknowledges the transfer conditions or with a visual display, an operator may acknowledge the transfer conditions.

Background of the invention

In the expanding field of undersea technology, a requirement exists for a system to enable an undersea vehicle to accurately maintain a navigational course over a limited area. This requirement exists for ocean bottom mapping, rescue operations, salvage operations, scientific explorations as well as for general guidance and control. To this end there has been proposed an arrangement utilizing a plurality of transponders in a known array.

Basically, a transponder is a device which, upon receipt of an interrogation signal, will transmit its own individually characteristic signal. If the undersea vehicle is utilized to transmit the interrogation signal, and in response to the interrogation signals the transponders of the array transmit return signals, the distance to the various transponders may be determined and the exact position of the undersea vehicle with respect to the transponder array may be calculated.

It is therefore an object of the present invention to provide a highly reliable signal processing apparatus to enable the accurate positioning of an undersea vehicle.

Another object is to provide a signal processor for presenting data to an onboard or remote computer for navigational computation.

It is another object to provide a processor for presenting the data to enable an operator to manually determine navigational position as a backup for an onboard computer or for situations where no computer is utilized.

Another object is to provide signal processor apparatus which is compatible with the small space requirements of various undersea vehicles.

In obtaining the distance from the undersea vehicle to a particular transponder, a digital counter may be started when the interrogate pulse is transmitted. When the transponder signal is received back at the vehicle, the count in the digital counter is indicative of the distance from the vehicle to that particular transponder. Since the speed of sound may change with various depth ranges it is possible that some error may be introduced in the reading of the digital counter.

It is therefore another object of the present invention to provide a signal processor unit, for a navigation system utilizing a digital counter and wherein compensation for varying speeds of sound in water may be made.

Summary of the invention

Briefly, in accordance with the above objects, signal processor apparatus is provided for receiving individually characteristic signals from a plurality of transponders in a predetermined array. The signals are capable of being received on a plurality of receiving channels each including a gating means individually adapted to receive a particular transponder signal.

Enabling means individually and sequentially enables the gating means of the receiving channels while a range counter provides a running range count. Storage means are provided and a control means is operable to transfer to the storage means information relative to which transponders signal is being received and the range to that particular transponder. This operation is continued by the control means until a predetermined number of signals have been received, after which the receiving channels are inhibited, and a transfer of data takes place to a data utilization means.

In order to plot the position of an undersea vehicle carrying the signal processor apparatus relative to the transponder array it is preferable that at least three transponder signals be received so that a navigational fix may be established. After the three signals have been received the range and transponder information may be transferred to either a computer apparatus or to a display on a console whereby an operator may manually calculate the navigational position in response to a visual read-out of the range information.

Other features too numerous to be mentioned in a brief summary of the invention, in addition to a detailed explanation of the operation of the present invention will become apparent upon a reading of the following specification taken in conjunction with the drawings.

Description of the preferred embodiment

Figure 1:
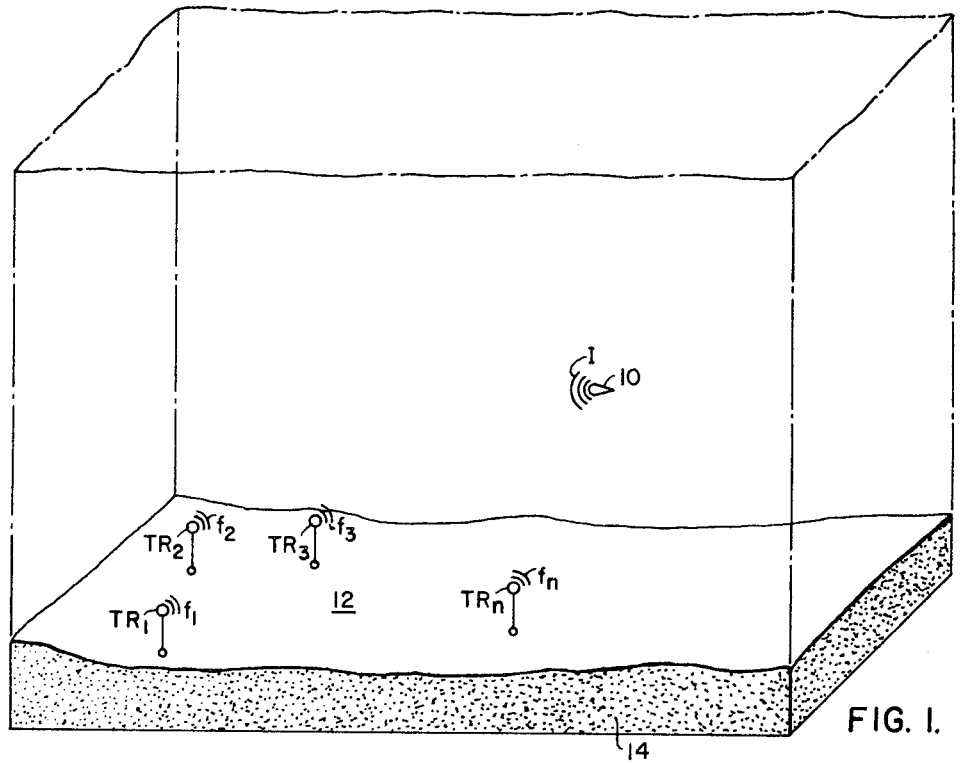
FIGURE 1 illustrates a typical undersea application of the present invention.

Referring now to FIG. 1, there is depicted one type of situation in which the present invention finds application. An undersea vehicle 10 transmits an interrogation signal I to a transponder array 12 of a known and predetermined configuration. Although only four transponders, $TR_1$, $TR_2$, $TR_3$ . . . $TR_n$, are illustrated, a typical transponder array may include for example 10 transponders each separated by a distance of two miles, although the particular separation, number and configuration depends upon the particular job requirement and navigation situation.

The transponders are generally anchored to the sea bottom 14 and each transponder is operable upon receipt of the interrogation signal I to transmit its own signal which may be detected by apparatus on the undersea vehicle 10. In order to be able to identify which transponders originate the signals being received by the undersea vehicle 10, it is customary that the transponders transmit individually characteristic signals which may take the form of a particular code, or as illustrated in FIG. 1, a particular frequency $f_1$, $f_2$, $f_3$ . . . $f_n$, respectively, for the four transponders illustrated.

Since transponder $TR_3$ is closer to the vehicle 10 than is transponder $TR_1$, for example, the $f_3$ signal will be detected before the $f_1$ signal. By knowing the time at which the interrogation signal is transmitted and knowing the time thereafter when a particular transponder signal is received by the vehicle 10, the range to that particular transponder may be derived. Whether the vehicle 10 is outside or inside the transponder array 12, the range to individual transponders may be obtained and from this range information, the navigational position of the vehicle 10 with respect to the transponder array 12 may be calculated, and to this end reference is now made to FIG. 2.

Figure 2:
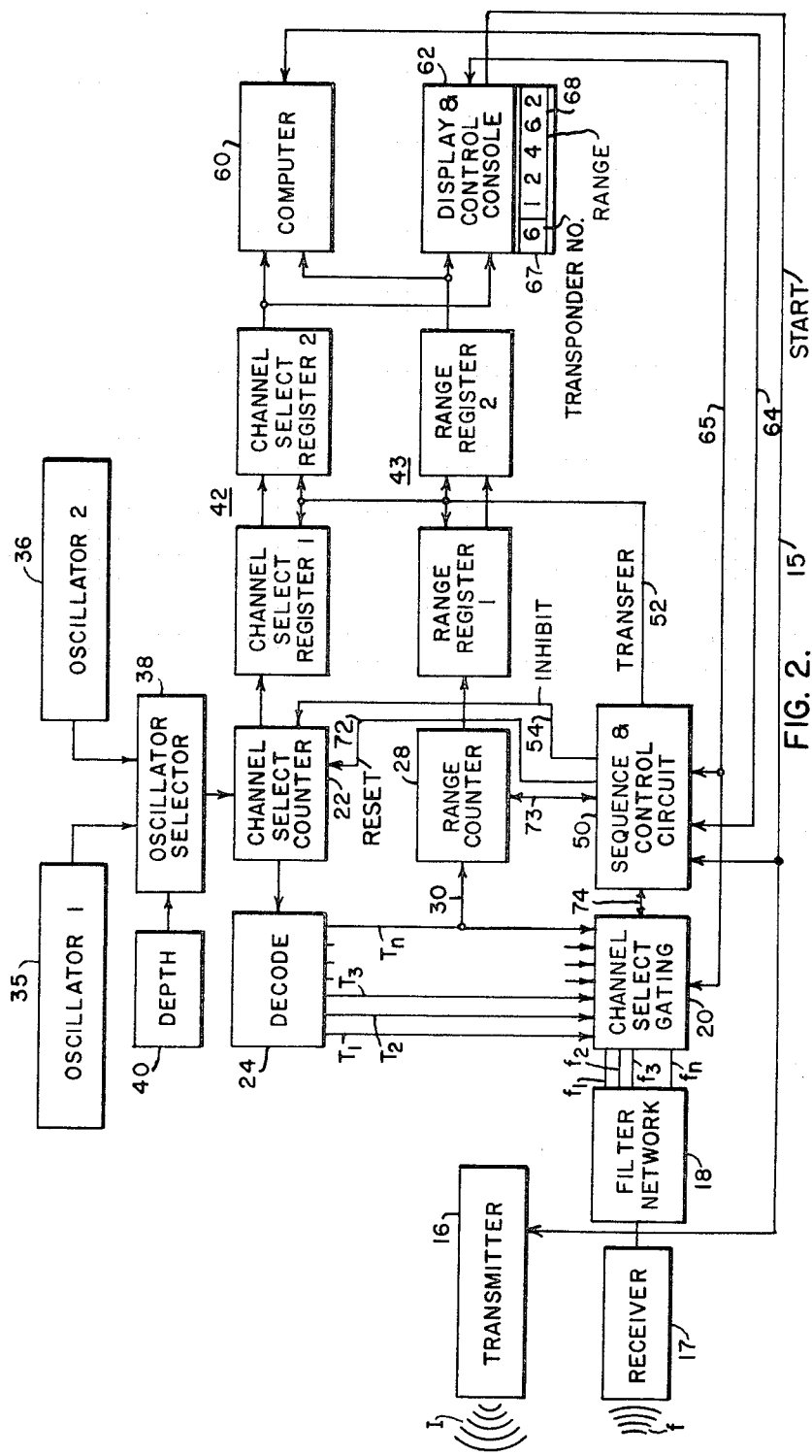
FIG. 2 is a block diagram illustrating an embodiment of the present invention.

FIG. 2 illustrates vehicle carried signal processor apparatus in accordance with a preferred embodiment of the present invention. Upon an initial command, for example a start signal from the display and control console 62, along line 15 the transmitter 16 transmits an interrogation signal I to the transponder array. Upon receipt of the interrogation signal, each transponder will transmit its individually characteristic frequency signal (collectively indicated by the signal $f$ in FIG. 2) which is detected and amplified by the receiver 17.

Depending upon the vehicle location relative to the transponder array, one or more transponders may not transmit their signals since they are out of range, two or more transponder signals may arrive at the vehicle simultaneously while the remaining ones arrive at different later times, or all of the transponder signals may arrive at the vehicle at different times. Since a frequency is associated with each transponder, in order to determine which transponder signals are arriving at the vehicle, there is provided a filter network 18 which receives the output signal from the receiver 17 and is operable to provide an individual signal on one or more of a plurality of output lines designated by the corresponding frequency signals $f_1$, $f_2$, $f_3$ ... $f_n$, depending upon which frequency or frequencies were contained in the received signal.

A channel select gating means 20 is provided and includes a plurality of receiving channels each channel including gating means for receipt of a respective one of the transponder signals from lines $f_1$ through $f_n$.

A scanning means is provided to individually and sequentially enable the gating means of the channel select gating 20 to individually determine which channel has a received signal. The enabling means includes a channel select counter 22 which in a well-known manner may include a plurality of flip-flop devices arranged as a binary counter in response to successive input or clock pulses. The output of the channel select counter 22 is decoded by the decode circuit 24 which provides an output signal on one and only one of a plurality of output lines $T_1$ through $T_n$ each of which is connected to a separate gating means of the channel select gating 20 as will be described.

The distance to a particular transponder can be determined with a knowledge of the elapsed time between a transmission of an interrogation signal and the receipt of the transponder signal. In the embodiment of the invention illustrated in FIG. 2, this function is provided by the range counter 28 which, like the channel select counter 22, may include a plurality of flip-flops operable to perform a counting function in response to input pulses. After transmission of the interrogation signal, the range counter 28 is caused to initiate its counting function to provide a running range count, with each count indication in the counter therefore representing a particular range. If the count in the range counter 28 is examined when the transponder signals are received, the range to the particular transponders therefore is known.

Since two or more transponder signals may arrive simultaneously, indicating that they are at the same distance from the vehicle, the channel select counter 22 frequency is made greater than the range counter 28 frequency so that all of the receiving channels may be examined prior to an advancement of the running range count. This is accomplished by pulsing the range counter 28 simultaneously with the enabling of the last gate (or any other one individual gate) of the channel select gating 20, as illustrated by the connection of line 30 to line $T_n$ of the decode circuit 24. It is therefore seen that for $n$ channels the range counter frequency is $1/n^{\text{th}}$ that of the channel select counter frequency and that the range count is advanced each time and only after all the gates are enabled.

Since the speed of sound in water may vary with different factors including depth, means are provided to compensate for varying speeds of sound. One method of compensation includes varying the frequency of the channel select counter 22 (and therefore of the range counter 28). This may be accomplished by the provision of a plurality of oscillators of which two, 35 and 36 are shown. Each oscillator 35 or 36 provides a different frequency output signal, or more commonly, a clock pulse signal and an oscillator selection circuit 38 is provided to determine which oscillator provides the clock pulse to sequence the channel selection counter 22. At least one external factor is considered in the selection of the oscillator and this external factor may conveniently be a depth information as indicated by the block 40.

When a particular channel receiving a transponder signal is enabled by a signal on one of the lines $T_1$ to $T_n$ of the decode circuit 24, the channel select counter 22 is at a particular count. That particular count enabling the corresponding gating means of the channel receiving the transponder signal therefore is also indicative of which particular transponder of the array sent the signal, and the count in the range counter 28 is indicative of the range to that particular transponder. In order to utilize this data for future calculations, there is provided channel selection storage means 42 and range storage means 43. Although the transponder array may include ten transponders, it is only necessary that the range to three transponders be known in order to calculate navigational position. Therefore the channel select storage means 42 includes only two registers in the form of channel select register 1 and channel select register 2 for the storage of information relative to two transponders while the channel select counter 22 may store the information relative to the third transponder. In order to eliminate additional transfer gating circuitry and controls therefor, the registers are, for convenience, arranged in a serial fashion for data transfer. In a similar manner the range storage means 43 includes range register 1 and range register 2 with the range counter 28 functioning as a third storage.

In order to determine when a predetermined number of transponder signals have been received (three in the example given) to effect transfer of various data, and to control other operations to be described, there is provided a sequence and control circuit 50. When the first transponder signal is received, the control circuit 50 provides a signal on the transfer line 52 to enable the channel select register 1 to receive the particular information in the channel select counter 22 (indicative of which transponder sent the signal) and allow the range register 1 to receive the range information from the range counter 28 (indicative of the range to the transponder). When a second transponder signal is received, the control circuit 50 again sends out a transfer signal on line 52 such that the channel select register 2 receives the information that was stored in the channel select register 1 which in turn receives the information that was present in the channel select counter 22. Similarly, the range register 2 receives the information that was stored in the range register 1 which in turn receives the then particular count of the range counter 28. In response to a third received transponder signal, the control circuit 50 provides a signal on the inhibit line 54 to inhibit the counting of the channel select counter 22 which then serves as a storage device for the last received signal. At this particular time, the channel select counter 22 and the two channel select registers have data identifying three transponders of the array and the range counter 28 along with range registers 1 and 2 contain information relative to the ranges to those three particular transponders. In order to utilize this data there is provided a data utilization means which in one form may be a computer 60 or in another form may be the display and control console 62. When the three ranges have been obtained, the control circuit 50 signals the computer via a conductor in line 64, or the display and control console via a conductor in line 65 that the data are ready to be operated upon.

If the computer 60 is being utilized to compute the navigational position, it will send back a signal via a conductor in line 64 to the control circuit 50 indicating that the computer is ready to receive data. The control circuit 50 will then sequence to provide a transfer signal on line 52 which shifts the information such that the computer receives the data in channel select register 2 and range register 2. When this information is received by the computer 60 it transmits a signal indicating a readiness to receive more data. One example of such a signal is a data acknowledge signal sent to the control circuit 50 indicating that the data transfer has been made to it whereupon another transfer signal is provided by the control circuit. This operation is continued until all of the data are transferred to the computer. With proper telemetry or communication the computer 60 may be in a position remote from the undersea vehicle, such as on a surface support vessel.

When operating with the display and control console 62 a visual read-out means is provided and contains a first section 67 for interpreting and displaying the information in the channel select register 2, and a second section 68 for interpreting and displaying the information in range register 2. After three transponder signals have been received, a signal may be sent to the display and control console 62 via a conductor in line 65 to indicate that all of the data are ready whereupon an operator sitting at the console may manually transmit a signal back to the control circuit 50 to effect a transfer of information such that the range and transponder information relative to the second received signal may be displayed and noted. After the second notation the operator may transmit another data acknowledge signal to the control circuit 50 such that the last bit of information is displayed and a manual computation of vehicle position relative to the transponder array may be made.

The control circuit 50 is seen to be communicative with the channel select counter 22, the range counter 28 and channel select gating means 20, and vice versa via lines 72, 73 and 74 respectively. These communications, in addition to important features of the control circuit 50 are described in FIG. 3, to which reference is now made.

The control circuit 50 includes control counter 75 which is operable to count in sequence in response to signals on the advance counter line 76. Basically, in the example given, the control counter 75 is operable to count from zero to five and then back to zero, with each count being triggered by an input pulse. With the counter at zero, a first received signal will cause the counter to advance to one at which time, a transfer of information from the channel select counter 22 (FIG. 2) and range counter 28 takes place to the channel select register 1 and range register 1 respectively. When a second input signal is received the counter advances to two and another transfer of information takes place. When a third received signal comes in, the counter is advanced to three, the channel select counter 22 is inhibited and a signal is sent to the data utilization means that all the information necessary to compute a navigational position is in storage and ready to be transferred. The computer or an operator at the control console acknowledges receipt of this information and transmits a signal back such that the counter is advanced to four and another transfer of information takes place in response to the counter advance. This latter transfer is again acknowledged and the counter advances to five, another transfer takes place and when acknowledged the counter advances to zero and the final transfer of information takes place to the computer or to the visual display 67–68 on the control console.

The foregoing operation is accomplished by the provision of gating means such as OR gate 78 which is operable to receive on three separate input lines a signal "signal received" indicating that a transponder signal has been received, a signal from the computer, "computer acknowledge" indicating that data may be transferred or data has been transferred to it, and a signal from the display and control console, "console acknowledge" indicating a ready state whereby initial or additional data should be transferred to it. The provision of any one of these signals to the OR gate 78 will cause an advancement of the control counter 75.

Since various operations are to take place depending upon the count or state of the counter 75, there is provided a decode circuit 81 which senses the count in the control counter and provides one or more individual output signals in a well-known manner, depending upon the count.

In some situations the undersea vehicle will be at a range outside of the transponder array such that perhaps no signals will be received, only one signal will be received, or only two signals will be received. For the situation where only two signals are received, the range counter 28 (FIG. 2) will provide its running count until a maximum range is reached. Since the range to only two transponders may be of use in determining position, provision is made for advancing the counter to transfer data when only two signals have been received and maximum range on the counter is reached. This is accomplished by the provision of AND gate 84 which receives an indication of a two count from the decode circuit 81 and a second input, on the line 85, indicative of maximum range.

Under some circumstances it is desired to reset the control counter 75 back to zero and this may be accomplished by a signal on the reset line 87. An OR gate 89 is provided to receive one condition for resetting the counter 75, that condition being an initial start. If the situation arises where only one transponder signal is received and the maximum range on the counter 28 is reached, or if no transponder signals have been received and maximum range is reached the counter 75 will be reset. This function is accomplished by the provision of AND gate 91 which receives as one input a signal from the decode circuit 81 indicating that there is a count less than two, and as the other input the maximum range signal.

The transfer circuit 93 is operable to provide a transfer signal on line 52 (also shown in FIG. 2) in response to the state of the control counter 75 in conjunction with either a signal on the signal received line, the computer acknowledge line, or the console acknowledge line.

Once the control counter 75 has sequenced through its whole range, or if it is prematurely reset, various other circuits containing flip-flop devices will have to be reset. For this purpose there is provided the reset circuit 95 which is responsive to the control counter state to reset, as indicated, the range counter, the channel select counter and various flip-flops in the channel select gating 20 to be described.

Once sufficient data have been received to enable a computation, the data ready circuit 97 operates to signal the computer of this situation. In addition, a light or some sort of indicator may be placed on the control console to receive a signal from the data ready circuit 97 indicating to an operator that all of the data are ready to be transferred and viewed on the visual read-out device.

Figure 3:
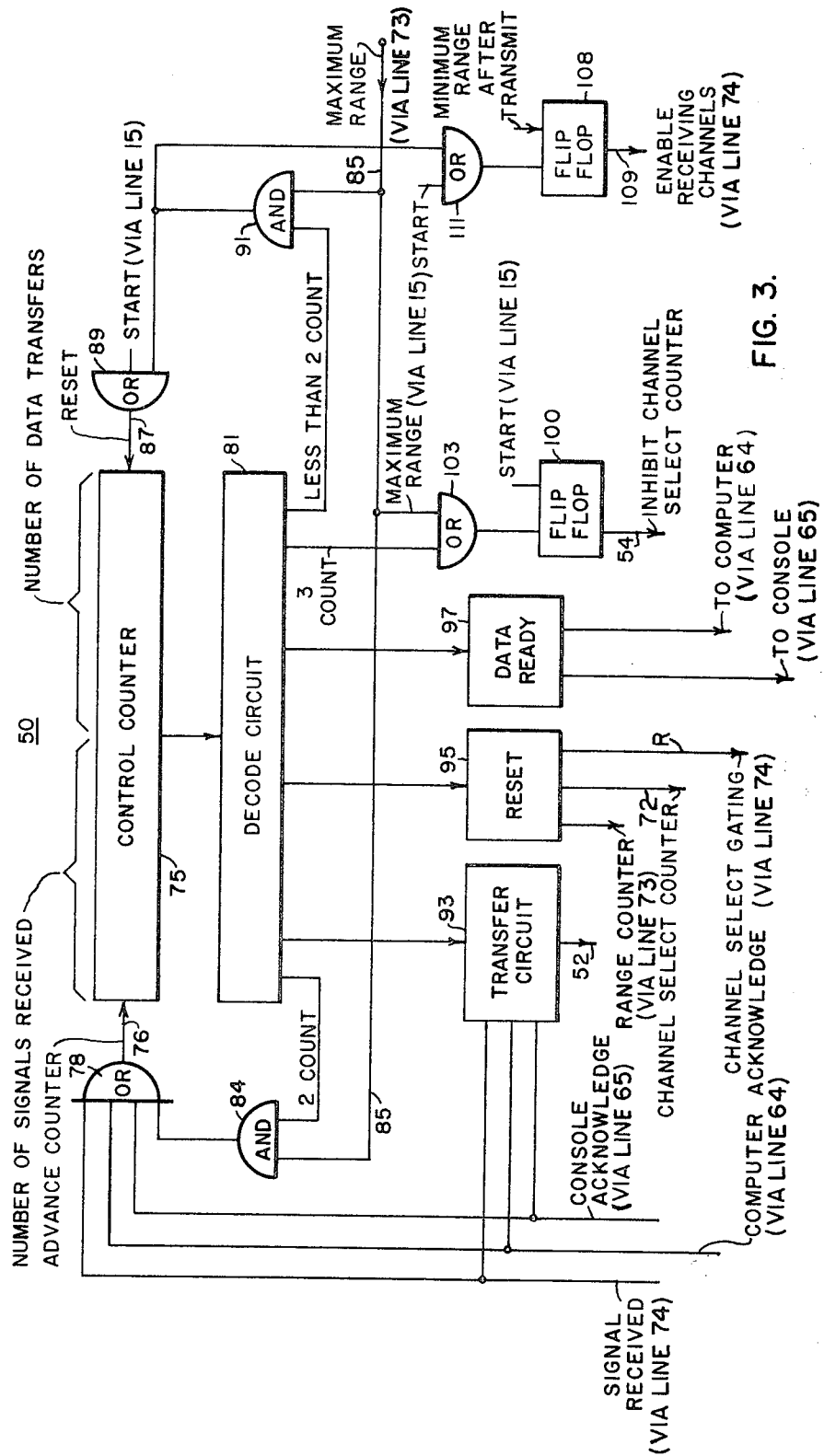
FIG. 3 illustrates a portion of the sequence and control circuit of FIG. 2 in somewhat more detail.

As previously stated the first two receiving transponder signals cause a transfer of information from the channel selector counter 22 and range counter 28 to the respective channel select and range registers while the channel select counter and range counter themselves act as a storage medium for the last transponder signal information. In FIG. 3 the control circuit is seen to include a flip-flop device 100 having as one output, line 54 (also shown in FIG. 2), which when energized, will inhibit the channel select counter 22 and therefore the range counter 28, from further counting. A signal may be placed on the inhibit line 54 as a result of an output from OR gate 103 one input to which is an indication that the control counter has reached state three. The inhibit line 54 may also provide an output signal to inhibit the counting function if a maximum range is attained as indicated by the other input to OR gate 103. An application of a signal such as a start signal via line 15 to the other input of flip-flop 100 will remove the inhibit signal from line 54 and enable the counters to perform their counting function.

If the receiving channels are turned on, that is enabled at a time when the interrogation signal is transmitted, an erroneous signal may be received due to reverberation and other effects. In order to prevent an unwanted signal from prematurely indicating a receipt of a transponder signal, the receiving channels are enabled only after a predetermined time after the interrogation pulse is transmitted. This predetermined time delay may conveniently be made equal to some count of the range counter 28. In order to so enable the receiving channels there is provided in the control circuit 50 a flip-flop 108 having an output line 109 which will provide an enabling signal in response to an input signal indicating a minimum range after transmit. This signal may come directly from one flip-flop of the range counter 28. To insure that an enable signal is not present on line 109 at transmission, an OR gate 111 having as one input a start signal provides a signal to the other input of flip-flop 108. The output of AND gate 91 indicative of maximum range attained on the counter with only one or no received signals will also cause the flip-flop 108 to remove the enabling signal on line 109.

Figure 4:
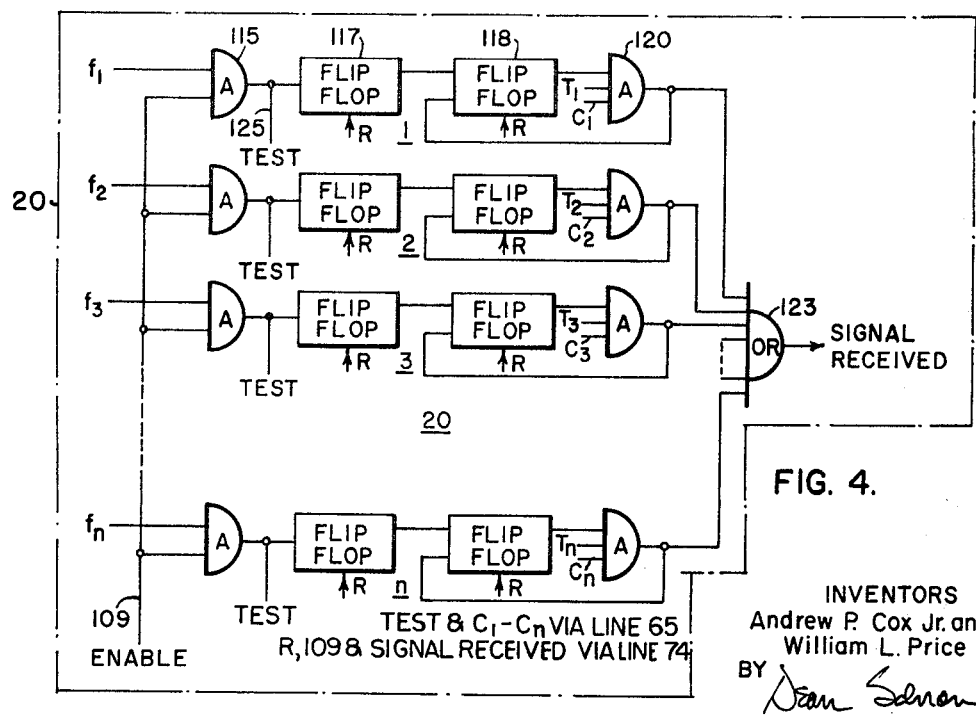
FIG. 4 is a logic diagram illustrating the channel selecting gating circuit of FIG. 2 in more detail.

FIG. 4 illustrates in somewhat more detail the channel select gating circuit of FIG. 2.

In FIG. 4 there is illustrated a plurality of receiving channels 1, 2, 3 . . . $n$ each operable to receive a respective frequency signal $f_1$, $f_2$, $f_3$ . . . $f_n$. Each channel, of which channel 1 is representative, includes an AND gate 115 providing its output to a first flip-flop 117 which in turn is operable to provide an input signal to a second flip-flop 118 when flip-flop 117 switches state of operation. An AND gate 120 receives the signal from the second flip-flop 118 indicating that a transponder signal has been received on channel 1. In addition AND gate 120 receives two other input signals and will provide an output signal only when all three input signals are present. One of the other input signals is the signal $T_1$ from the decode circuit 24 and constitutes a first enabling signal (FIG. 2) and the remaining signal $C_1$ constituting a second enabling signal is present at all times except when an operator wishes to selectively disable chosen ones of the AND gate 120. In this manner the operator may examine the input signals of all transponders and not necessarily only the first three.

As soon as the AND gate 120 provides an output signal it is fed back to flip-flop 118 to change its state of operation while at the same time flip-flop 117 remains set. This action insures that if a transponder signal arrives at the vehicle via two different routes as for example by reflection, it will not cause another received signal indication. The OR gate 123 receives the output from each of the AND gates 120 and in response to an output signal therefrom will provide a corresponding output signal indicating that a transponder signal has been received.

A testing of the receiving channels may be accomplished by the provision of a test line 125 which when suitably energized from, for example, the control console or a particular flip-flop of the range counter 28 will simulate an input signal to the flip-flop 117. The description of channel 1 holds true for the remaining channels with the exception that each of the AND gates in the AND gate 120 position receives a different one of the enabling signals from decode circuit 24. These enabling signals are designated in the remaining channels, $T_2$, $T_3$ . . . $T_n$. In addition each of these AND gates may be separately enabled or disabled by the signals designated $C_2$, $C_3$ . . . $C_n$.

Although the present invention has been described with a certain degree of particularity, it should be understood that the present disclosure has been made by way of example and that modifications and variations of the present invention are made possible in the light of the above teachings.

What is claimed is:

1. Signal processor apparatus for a navigation system wherein a plurality of transponders are arranged in a predetermined array with each transponder being operable to transmit an individually characteristic signal upon receipt of an interrogation signal, comprising:
   (A) a plurality of receiving channels each including gating means for receipt of a separate one of the transponder signals;
   (B) channel selection counter means for individually and sequentially providing first enabling signals to the gating means of said receiving channels to gate respective ones of the transponder signals;
   (C) range counter means for providing a running range count;
   (D) channel selection storage means;
   (E) range storage means;
   (F) control means
      (1) responsive to a first received and gated transponder signal and operable to transfer the count indications of said channel selection counter means and said range counter means to said channel selection storage means and said range storage means, respectively,
         (a) with the channel selection count being indicative of which channel received, and therefore, of which particular transponder of the array sent the signal, and
         (b) with the range count being indicative of the range to said particular transponder,
      (2) responsive to a predetermined number of subsequent received and gated transponder signals and operable to transfer the then respective count indication of said channel selection counter means and said range counter means to their respective storage means, and
      (3) operable after said predetermined number of transponder signals are received to effectively inhibit said gating means; and
   (G) means operably connected to said storage means and including visual display means for interpreting and displaying the data contained in said storage means, said visual display means including
      (1) a first section for displaying a transponder designation and
      (2) a second section for displaying the range to said last named transponder.

2. Apparatus according to claim 1 wherein:
   (A) the channel selection storage means includes a plurality of individual channel selection registers;
   (B) the range storage means includes a plurality of individual range registers; and wherein after the predetermined number of transponder signals are received
   (C) the control means is operable to inhibit further counting of the channel selection and range counters whereby said counters function as storage devices for the channel selection count and range count of the last transponder signal.

3. Apparatus according to claim 2 wherein:
   (A) the plurality of channel selection registers are serially connected to receive data from a next preceding register, with a first register being operable to receive data from the channel selection counter and a last register being operable to transmit its data to the visual display means;
   (B) the plurality of range registers are serially connected to receive data from a next preceding range register, with a first register being operable to receive data from the range counter, and a last register being operable to transmit its data to the visual display means.

4. Apparatus according to claim 3 wherein:
(A) data are transferred
  (1) when a transponder signal is received, and after the predetermined number of transponder signals are received
  (2) in response to a manually actuated signal from an operator viewing the display.

5. Apparatus according to claim 2 wherein:
(A) the channel selection storage means comprises two registers;
(B) the range storage means comprises two registers; and wherein
(C) with the counters functioning as storage devices, information relative to the three transponders and their respective ranges may be displayed, whereby an operator may manually calculate navigational position.

6. Apparatus according to claim 1 wherein:
(A) the control means includes a control counter which is advanced each time a gating means gates a transponder signal;
(B) the transfer of the count indications being effected by the advance of said counter.

7. Apparatus according to claim 6 which includes:
(A) means to reset the control counter when less than two transponder signals are received and the maximum reading on the range counter is reached.

8. Apparatus according to claim 1 wherein:
(A) means are provided for inhibiting the gating means until a predetermined time after an interrogation signal is transmitted.

9. Apparatus according to claim 8 wherein:
(A) the inhibiting of the gating means is removed in response to a predetermined minimum count of the range counter.

10. Apparatus according to claim 1 wherein:
(A) the range count is advanced each time, and only after, all the gating means have been enabled.

11. Apparatus according to claim 1 wherein:
(A) for $n$ receiving channels, the counting frequency of the channel select counter is $n$ times the counting frequency of the range counter.

12. Apparatus according to claim 11 wherein:
(A) the range count in response to a selected one of the enabling signals supplied to the gating means.

13. Apparatus according to claim 1 which additionally includes
(A) means for providing second enabling signals to the gating means to selectively disable chosen ones of said gating means even though supplied with a first enabling signal.

14. Apparatus according to claim 1 which additionally includes:
(A) means for providing a test signal to the channels to simulate a transponder signal.

15. Apparatus according to claim 14 wherein:
(A) the test signal is provided by the range counter after a predetermined count is reached.

16. Apparatus according to claim 1 which additionally includes:
(A) oscillator means for providing a clock pulse signal to advance the channel selection counter.

17. Apparatus according to claim 16 wherein:
(A) the oscillator means comprises a plurality of oscillators each operable to provide a different frequency clock pulse signal; and wherein
(B) means are provided to selectively choose one of said oscillators with a factor related to speed of sound in water.

18. Signal processor apparatus for a navigation system wherein a plurality of transponders are arranged in a predetermined array with each transponder being operable to transmit an individually characteristic signal upon receipt of an interrogation signal, comprising:
(A) a plurality of receiving channels each including gating means for receipt of a separate one of the , transponder signals;
(B) channel selection counter means for individually and sequentially providing first enabling signals to the gating means of said receiving channels to gate respective ones of the transponder signals;
(C) range counter means for providing a running range count;
(D) channel selection storage means;
(E) range storage means;
(F) computer means;
(G) control means
  (1) responsive to a first received and gated transponder signal and operable to transfer the count indications of said channel selection counter means and said range counter means to said channel selection storage means and said range storage means, respectively,
    (a) with the channel selection count being indicative of which channel received, and therefore, of which particular transponder of the array sent the signal, and
    (b) with the range count being indicative of the range to said particular transponder,
  (2) responsive to a predetermined number of subsequent received and gated transponder signals and operable to transfer the then respective count indications of said channel selection counter means and said range counter means to their respective storage means,
  (3) operable after said predetermined number of transponder signals are received
    (a) to effectively inhibit said gating means, and
    (b) to transmit a data ready signal to said computer means indicating that a transfer of data from said storage means to said computer means may take place;
(H) said computer means including means for transmitting data acknowledge signals to said control means indicating a readiness to receive said data.

19. Apparatus according to claim 18 wherein:
(A) the channel selection storage means includes a plurality of individual channel selection registers;
(B) the range storage means includes a plurality of individual range registers; and wherein after the predetermined number of transponder signals are received
(C) the control means is operable to inhibit further counting of the channel selection and range counters whereby said counters function as storage devices for the channel selection count and range count of the last transponder signal.

20. Apparatus according to claim 19 wherein:
(A) the plurality of channel selection registers are serially connected to receive data from a next preceeding register, with a first register being operable to receive data from the channel selection counter and a last register being operable to transmit its data to the computer means
(B) the plurality of range registers are serially connected to receive data from a next preceding range register, with a first register being operable to receive data from the range counter, and a last register being operable to transmit its data to the computer means.

21. Apparatus according to claim 19 wherein:
(A) the channel selection storage means comprises two registers
(B) the range storage means comprises two registers, and wherein (C) with the counters functioning as storage devices, information relative to three transponders and their respective ranges may be transferred to said computer means, for computation of navigational position.

22. Apparatus according to claim 18 wherein:
(A) the control means includes a control counter which is advanced
(1) each time a gating means gates a transponder signal, and
(2) each time the computer transmits a data acknowledge signal;
(B) the transfer of the count indications being effected by the advance of said counter.

23. Apparatus according to claim 22 which additionally includes:
(A) means to reset the control counter when less than two transponder signals are received and the maximum reading on the range counter is reached.

24. Apparatus according to claim 18 wherein:
(A) means are provided for inhibiting the gating means until a predetermined time after an interrogation signal is transmitted.

25. Apparatus according to claim 24 wherein:
(A) the inhibiting of the gating means is removed in response to a predetermined minimum count of the range counter.

26. Apparatus according to claim 18 wherein:
(A) the range count is advanced each time, and only after all the gating means have been enabled.

27. Apparatus according to claim 18 wherein:
(A) for $n$ receiving channels, the counting frequency of the channel select counter is $n$ times the counting frequency of the range counter.

28. Apparatus according to claim 27 wherein:
(A) the range count is advanced in response to a selected one of the enabling signals supplied to the gating means.

29. Apparatus according to claim 18 which additionally includes:
(A) means for providing second enabling signals to the gating means to selectively disable chosen ones of said gating means even though supplied with a first enabling signal.

30. Apparatus according to claim 18 which additionally includes:
(A) means for providing a test signal to the channels to simulate a transponder signal.

31. Apparatus according to claim 30 wherein:
(A) the test signal is provided by the range counter after a predetermined count is reached.

32. Apparatus according to claim 18 which additionally includes:
(A) oscillator means for providing a clock pulse signal to advance the channel selection counter.

33. Apparatus according to claim 32 wherein:
(A) the oscillator comprises a plurality of oscillators each operable to provide a different frequency clock pulse signal, and wherein
(B) means are provided to selectively choose one of said oscillators in accordance with a factor related to speed of sound in water.

References Cited

UNITED STATES PATENTS 3,213,410 10/1965 Hagemann.
3,223,998 12/1965 Hose _____ 343—6.5 X RODNEY G. BENNETT, *Primary Examiner.*

MALCOLM F. HUBBER, *Assistant Examiner.*

U.S. Cl. X.R.

340—1, 3